(12) United States Patent  (10) Patent No.: US 9,964,795 B2
Im et al.  (45) Date of Patent: May 8, 2018

(54) CURVED DISPLAY DEVICE (71) Applicant: Samsung Display Co., Ltd., Yongin-si (KR)

(72) Inventors: Wan-Soon Im, Cheonan-si (KR); Joong Gun Chong, Yongin-si (KR); Jong Hak Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 17 days.

(21) Appl. No.: 14/881,639

(22) Filed: Oct. 13, 2015

(65) Prior Publication Data

US 2016/0223857 A1  Aug. 4, 2016

(30) Foreign Application Priority Data

Jan. 29, 2015 (KR) .................. 10-2015-0014348

(51) Int. Cl.
*G02F 1/1335* (2006.01)
*G02F 1/1343* (2006.01)
*G02F 1/1333* (2006.01)
*G02F 1/1362* (2006.01)

(52) U.S. Cl.
CPC .. *G02F 1/133514* (2013.01); *G02F 1/134309* (2013.01); *G02F 1/133305* (2013.01); *G02F 1/133512* (2013.01); *G02F 2001/133519* (2013.01); *G02F 2001/136222* (2013.01); *G02F 2201/52* (2013.01)

(58) Field of Classification Search
CPC ............. G02F 1/133514; G02F 1/1343; G02F 1/134309
See application file for complete search history.

(56) References Cited

U.S. PATENT DOCUMENTS

| 8,405,803 | B2 | 3/2013 | Kim et al. |
| 9,091,884 | B2 | 7/2015 | Kim et al. |
| 2004/0169807 | A1* | 9/2004 | Rho .................. G02F 1/133514 349/139 |
| 2005/0128413 | A1* | 6/2005 | Son .................... G02F 1/134363 349/143 |

(Continued)

FOREIGN PATENT DOCUMENTS

| KR | 1020080049325 | 6/2008 |
| KR | 1020100077979 | 7/2010 |

(Continued)

*Primary Examiner* — Kendrick Hsu
(74) *Attorney, Agent, or Firm* — H.C. Park & Associates, PLC (57) ABSTRACT

A curved display device includes a first substrate, a second substrate facing the first substrate, a liquid crystal layer disposed between the first substrate and the second substrate, and a first color pixel area, a second color pixel area, a third color pixel area, and a fourth color pixel area disposed on the first substrate or the second substrate, in which the first substrate and the second substrate each includes a center portion and an edge portion surrounding the center portion, the first, second, and third color pixel areas include a red filter, a green filter, and a blue filter, respectively, the fourth color pixel area include a white filter, and the fourth color pixel area is disposed at the edge portion of the first or second substrate, and is smaller than each of the first, second, and third color pixel areas.

19 Claims, 8 Drawing Sheets (56) References Cited

U.S. PATENT DOCUMENTS

2008/0272997 A1* 11/2008 Shin ................ G02F 1/134336
  345/87
2014/0043217 A1  2/2014 Kim et al.
2014/0133073 A1  5/2014 Ahn et al.

FOREIGN PATENT DOCUMENTS

| KR | 1020120138205 | 12/2012 |
| KR | 101269006 | 5/2013 |
| KR | 1020140020120 | 2/2014 |
| KR | 1020140060078 | 5/2014 |

* cited by examiner

CURVED DISPLAY DEVICE

CROSS-REFERENCE TO RELATED APPLICATION

This application claims priority from and the benefit of Korean Patent Application No. 10-2015-0014348, filed on Jan. 29, 2015, which is hereby incorporated by reference for all purposes as if fully set forth herein.

BACKGROUND

Field

Exemplary embodiments of the present invention relate to a curved display device including a white pixel.

Discussion of the Background

A liquid crystal display (LCD) may be a flat panel display that includes two display panels including field generating electrodes, such as a pixel electrode and a common electrode and a liquid crystal layer interposed between the two display panels. The LCD may generate an electric field in the liquid crystal layer by applying a voltage to the field generating electrodes, determine an alignment of liquid crystal molecules of the liquid crystal layer through the generated electric field, and display an image by controlling the polarization of incident light.

The LCD may not be self-emissive, and thus may require a light source. The light source may be a separately provided artificial light source or a natural light source. The artificial light source used in the LCD includes a light emitting diode (LED), a cold cathode fluorescent lamp (CCFL), and an external electrode fluorescent lamp (EEFL). The artificial light source is disposed at a rear surface or a side surface of the LCD to supply light. The light source may be a white light source for emitting white light.

An LCD may generally include a color filter to display red, green, and blue colors. An LCD further including white pixels, in addition to red, green, and blue pixels, has been studied to increase luminance therein.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a curved display device preventing light leakage and spots at an edge portion thereof by changing sizes of pixel areas.

Additional aspects will be set forth in the detailed description which follows, and, in part, will be apparent from the disclosure, or may be learned by practice of the inventive concept.

According to an exemplary embodiment of the present invention, a curved display device includes a first substrate, a second substrate facing the first substrate, a liquid crystal layer disposed between the first substrate and the second substrate, and a first color pixel area, a second color pixel area, a third color pixel area, and a fourth color pixel area disposed on the first substrate or the second substrate, in which the first substrate and the second substrate each includes a center portion and an edge portion surrounding the center portion, the first, second, and third color pixel areas include a red filter, a green filter, and a blue filter, respectively, the fourth color pixel area includes a white filter, and the fourth color pixel area is disposed at the edge portion of the first or second substrate, and is smaller than each of the first, second, and third color pixel areas.

The fourth color pixel area may be disposed at the center portion of the first and second substrate and may include the same size as the first, second, or third color pixel areas.

The curved display device may further include pixel electrodes respectively disposed in the first, second, third, and fourth color pixel areas, in which the pixel electrodes disposed in the first, second, third, and fourth color pixel areas may include the same size.

The red filter, the green filter, the blue filter, and the white filter may include the same size.

The curved display device may further include light blocking members disposed between the red, green, blue, and white filters, in which in the edge portion, a width of the light blocking member adjacent to the white filter disposed in the fourth color pixel area may be greater than a width of each of the light blocking members adjacent to the red filter, the green filter, and the blue filter.

The first, second, third, and fourth color pixel areas may include a quadrangular shape.

The curved display device may further include an overcoat covering the red, green, blue, white filters, and the light blocking members.

The curved display device may further include a light source disposed at a rear surface of the first or second substrate.

The curved display device may further include pixel electrodes respectively disposed in the first, second, third, and fourth color pixel areas, in which in the edge portion, the pixel electrode disposed in the fourth color pixel area may be smaller than each of the pixel electrodes disposed in the first, second, and third color pixel areas.

In the center portion, the fourth color pixel area may include the same size as the first, second, or third color pixel area.

The red, green, blue, and white filters may include the same size as the pixel electrodes disposed in the first, second, third, and fourth color pixel areas, respectively.

In the edge portion, among the red, green, blue, and white filters, the white filter may include a first size, one of the red, green, and blue filters may include a second size greater than the first size, and remaining filters may include a third size greater than the first size and smaller than the second size.

A difference between the first size and the third size may be the same as a difference between the second size and the third size.

The first size may include a width smaller than a width of each of the second and third sizes.

The first size may include a length less than a length of the second and third sizes.

The light blocking member may surround edge portions of the quadrangular shape.

According to the exemplary embodiments of the present invention, the curved display device may prevent light leakage and spots at the edge portion thereof by changing sizes of the pixel areas disposed at the edge portion of the display panel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A curved display device according to an exemplary embodiment of the present invention will now be described in detail with reference to FIGS. 1 and 2.

Figure 1A:
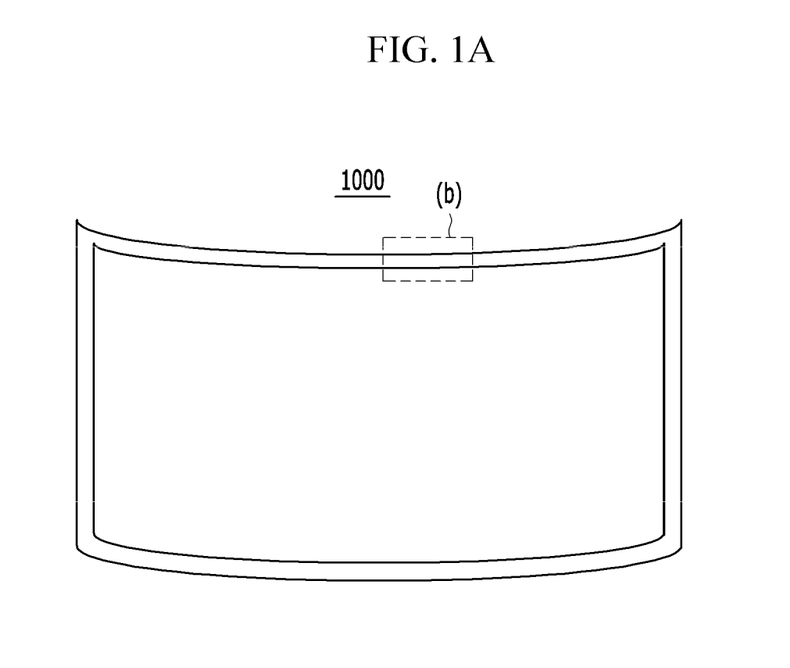
FIG. 1A is a top plan view of a curved display device according to an exemplary embodiment of the present invention.
Figure 1B:
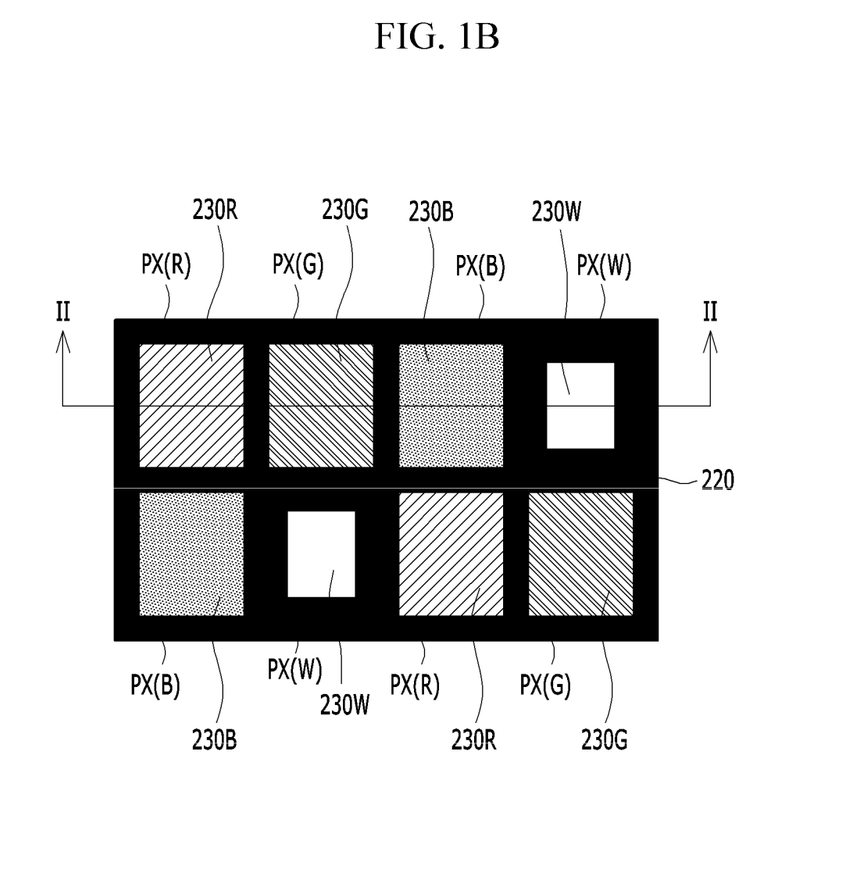
FIG. 1B is a top plan view of pixels disposed at portion (b) of FIG. 1A.
Figure 2:
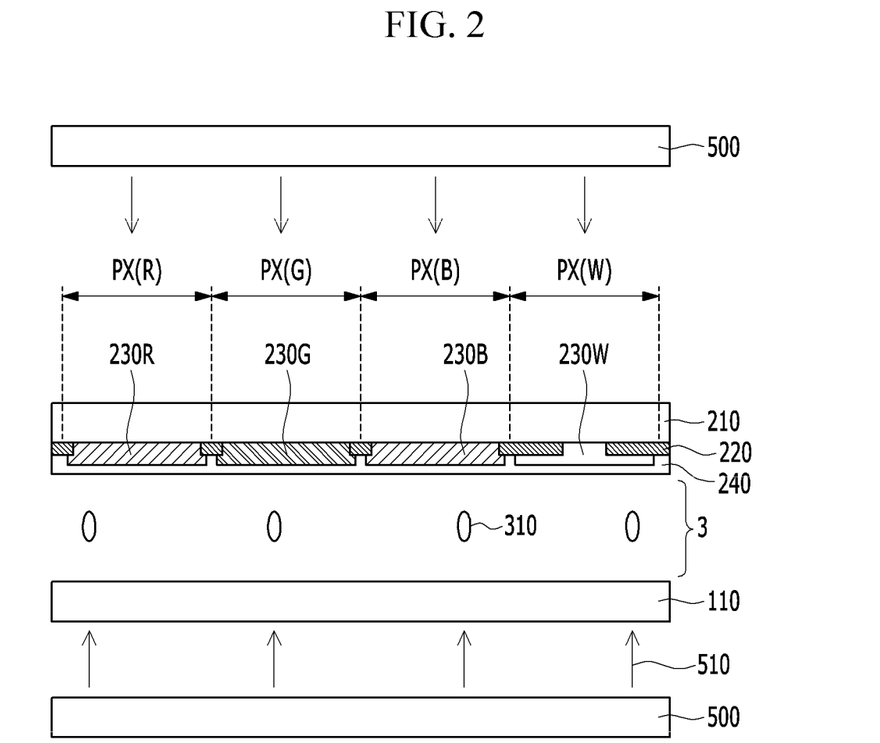
FIG. 2 is a cross-sectional view of FIG. 1B taken along line II-II'.

FIG. 1A is a top plan view of a curved display device according to an exemplary embodiment of the present invention, FIG. 1B is a top plan view of pixels disposed at portion (b) of FIG. 1A, and FIG. 2 is a cross-sectional view of FIG. 1B taken along line II-II'.

Referring to FIG. 1A, a curved display device according to the present exemplary embodiment may be bent by a predetermined curvature in a long side direction of a display panel 1000. Alternatively, the curved display device may be bent by a predetermined curvature in a short side direction thereof or may be bent by a predetermined curvature in short and long side directions thereof. The display panel 1000 includes a center portion and an edge portion surrounding the center portion.

Referring to FIGS. 1B and 2, the curved display device according to the present exemplary embodiment includes a first substrate 110 and a second substrate 210 facing each other, and a liquid crystal layer 3 disposed between the first substrate 110 and the second substrate 210. The first substrate 110 and the second substrate 210 may include glass or plastic. The liquid crystal layer 3 may include liquid crystal molecules 310, and may be a positive or negative type.

A light source 500 may be disposed at a rear surface of the first substrate 110. The light source 500 may include light emitting diodes (LEDs) and the like, and emit light 510. Alignment of the liquid crystal molecules 310 of the liquid crystal layer 3 is determined depending on an electric field generated between the first substrate 110 and the second substrate 210. An amount of light that passes through the liquid crystal layer 3 is varied depending on the alignment of the liquid crystal molecules 310. Color filters 230R, 230G, 230B, and 230W are disposed on the second substrate 210. A portion of wavelengths of the light passing through the liquid crystal layer 3 pass through respective color filters 230R, 230G, 230B, and 230W, and the remaining portions of the wavelengths are absorbed into the color filters. According to an exemplary embodiment of the present invention, the light source 500 may be disposed at a rear surface of the second substrate 210.

FIG. 1B is a top plan view of pixels formed in an edge portion of the curved display device according to the present exemplary embodiment. The edge portion may be a portion an edge region surrounding the center portion of the display panel 1000, and width and size of the edge portion may vary.

A liquid crystal display of the present exemplary embodiment may include pixel areas formed as a first color pixel area PX(R), a second color pixel area PX(G), a third color pixel area PX(B), and a fourth color pixel area PX(W). The first color pixel area PX(R), the second color pixel area PX(G), and the third color pixel area PX(B) respectively display different colors from each other, and the colors displayed from the first, second, and third color pixel areas PX(R), PX(G), and PX(B) may be combined into a white color. The fourth color pixel area PX(W) may display a white color. The first color pixel area PX(R), the second color pixel area PX(G), the third color pixel area PX(B), and the fourth color pixel area PX(W) may respectively display red, green, blue, and white colors. Alternatively, the first color pixel area PX(R), the second color pixel area PX(G), the third color pixel area PX(B), and the fourth color pixel area PX(W) may respectively display cyan, magenta, yellow, and white colors.

The color filters 230R, 230G, and 230B are disposed in the respective pixel areas on the second substrate 210. The first color filter 230R, the second color filter 230G, and the third color filter 230B are respectively disposed in the first color pixel area PX(R), the second color pixel area PX(G), and the third color pixel area PX(B). The first color filter 230R may exclusively permit red light of the white light to pass therethrough. The second color filter 230G may exclusively permit green light of the white light to pass therethrough. The third color filter 230B may exclusively permit blue light of the white light to pass therethrough. Hereinafter, the first color filter 230R, the second color filter 230G, the third color filter 230 B may also be referred to as red filter 230R, green filter 230G, and blue filter 230B, respectively.

The fourth color filter 230W may be disposed in the fourth color pixel area PX(W). The fourth color pixel area is transparent, and the fourth color filter 230W may be formed of a photoresist that may permit all wavelength bands of visual light to pass therethrough. More particularly, the fourth color filter 230W may not substantially change a wavelength of light passing therethrough and the color of the transmitted light may be substantially maintained. Alternatively, the fourth color filter 230W may change a wavelength of light passing therethrough in a predetermined range according to a characteristic of the fourth color filter 230W. Hereinafter, the fourth color filter 230W may also be referred to as white filter 230W.

Each of the pixel areas PX(R), PX(G), PX(B), and PX(W) has a rectangular shape with two short sides and two long sides. In the first color pixel area PX(R), the second color pixel area PX(G), the third color pixel area PX(B), and fourth color pixel area PX(W), the red filter 230R, the green filter 230G, the blue filter 230B, and the white filter 230W respectively have a quadrangular flat shape, such as the shape of the pixel areas PX(R), PX(G), PX(B), or PX(W).

Light blocking members 220 may be disposed at each boundary between the first color pixel area PX(R), the second color pixel area PX(G), the third color pixel area PX(B), and the fourth color pixel area PX(W). The light blocking member 220 may be disposed at each boundary between the pixel areas PX(R), PX(G), PX(B), and PX(W), to prevent color mixture, light leakage, and the like.

The fourth color pixel area PX(W) disposed at the edge portion of the curved display device of the present exemplary embodiment may be formed to have a smaller size than the first color pixel area PX(R), the second color pixel area PX(G), or the third color pixel area PX(B). Respective lengths of the short and long sides of the fourth color pixel area PX(W) may be relatively shorter than those of the first, second, or third color pixel areas PX(R), PX(G), or PX(B).

More particularly, a light blocking member 220 adjacent to the fourth color pixel area PX(W) may have a broader width than a light blocking member 220 adjacent to the first, second, or third color pixel areas PX(R), PX(G), or PX(B). Accordingly, the white filter 230W disposed in the fourth color pixel area PX(W) may block the light 510 in a broader region than the red filter 230R, the green filter 230G, or the blue filter 230B respectively disposed in the first, second, or third color pixel area PX(R), PX(G), or PX(B). In the remaining region except for the edge portion of the display panel 1000, the fourth color pixel area PX(W) may be formed to have the same size as the first, second, or third color pixel area PX(R), PX(G), or PX(B).

When a display panel 1000 including two substrates 110 and 210 is formed to have a curvature in manufacturing process of a curved display device, edge portions of the substrates 110 and 210 may be stressed. As such, phase retardation and birefringence of the light 510 may occur at the edge portions of the substrates 110 and 210. More particularly, light leakage may occur at the edge portions of the curved display panel 1000 due to the birefringence of the light 510 passing through the substrates 110 and 210. In addition, since a thickness of the substrates 110 and 210 is substantially greater than that of the liquid crystal layer 3, the birefringence of the light 510 at the substrates 110 and 210 due to the phase retardation may deteriorate display quality of the curved display panel 1000.

According to the present exemplary embodiment, when forming a curved surface for the display panel, the fourth color pixel area PX(W) disposed at the edge portions of the substrates 110 and 210, where the phase retardation may occur, is formed to be relatively smaller than the other pixel areas, such that a region transmitting the light 510 may be reduced, thereby preventing light leakage. Among the first, second, third, and fourth color pixel areas PX(R), PX(G), PX(B), and PX(W), only the fourth color pixel area PX(W) that includes the white filter 230W has a smaller size, because luminance of the light 510 transmitting through the white filter 230W is the highest. Further adjusting the area of the fourth color pixel area PX(W) may be effective to prevent light leakage without changing color coordinates of the display panel when the fourth color pixel area PX(W) is adjusted, since the white filter 230W represents no specific color filter.

An overcoat 240 may be disposed on the red filter 230R, the green filter 230G, the blue filter 230B, the white filter 230W, and the light blocking member 220. The overcoat 240 may planarize an upper surface of the second substrate 210. The white filter 230W and the overcoat 240 may be made of the same material by the same process.

The curved liquid crystal display according to the present exemplary embodiment will be further described with reference to FIGS. 3 and 4.

Figure 3:
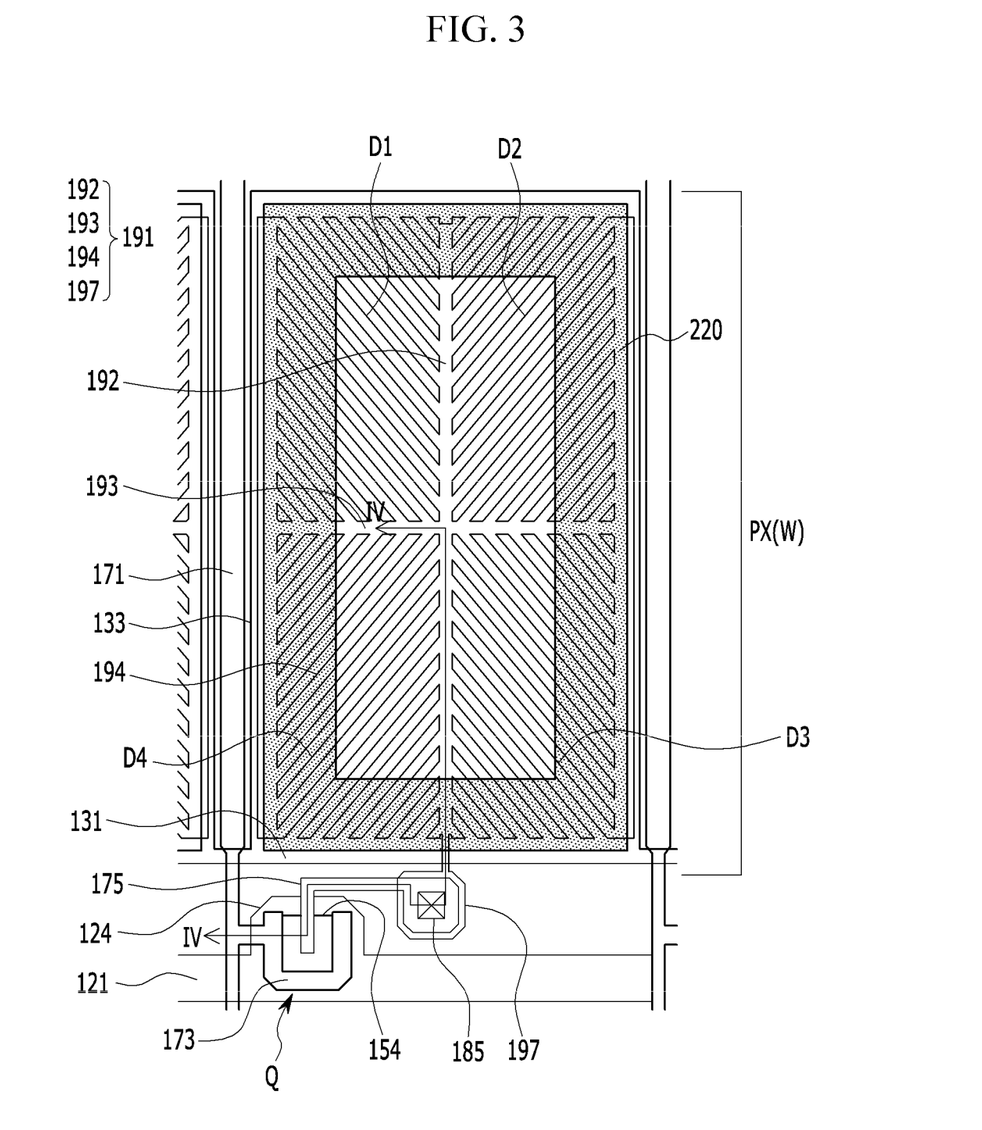
FIG. 3 is a top plan view of a white pixel area of a curved display device according to an exemplary embodiment of the present invention.
Figure 4:
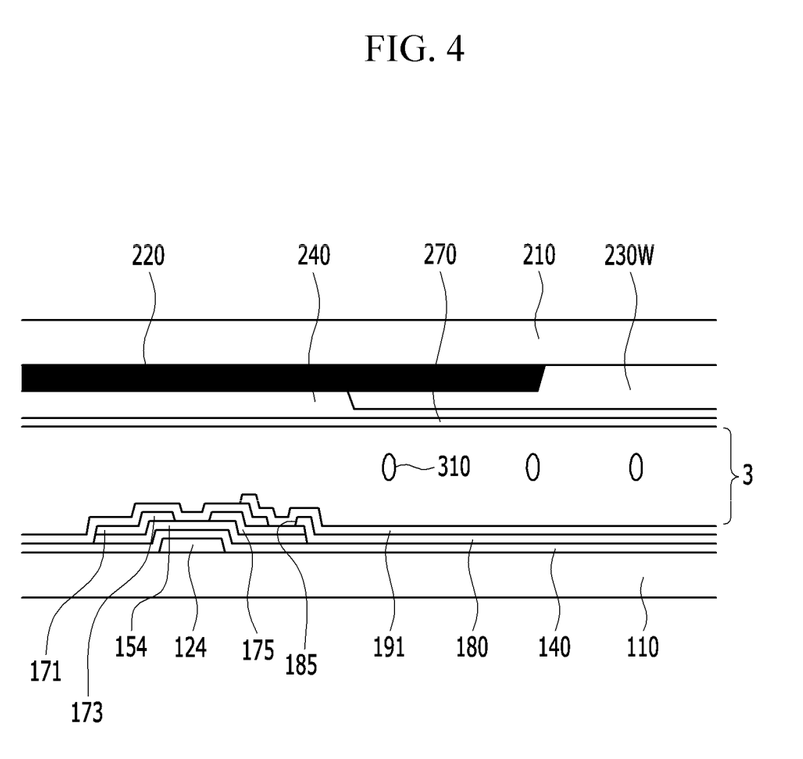
FIG. 4 is a cross-sectional view of FIG. 3 taken along line IV-IV'.

FIG. 3 is a top plan view of a white pixel area of the curved display device according to the present exemplary embodiment, and FIG. 4 is a cross-sectional view of FIG. 3 taken along line IV-IV'.

As shown in FIGS. 3 and 4, a gate line 121 and a storage electrode line 131 are formed on the first substrate 110. The gate line 121 substantially extends in a horizontal direction to transmit a gate signal. A gate electrode 124 is formed to be protruded from the gate line 121. The storage electrode line 131 extends in a direction parallel to the gate line 121, more particularly, in a horizontal direction, to transmit a predetermined voltage such as a common voltage. A storage electrode 133 extends from the storage electrode line 131. The storage electrode 133 may surround edges of the fourth color pixel area PX(W).

A gate insulating layer 140 is formed on the gate line 121, the gate electrode 124, the storage electrode line 131, and storage electrode 133. The gate insulating layer 140 may include an inorganic insulating material such as a silicon nitride (SiNx) and a silicon oxide (SiOx). The gate insulating layer 140 may include a single layer or multiple layers. A semiconductor 154 is formed on the gate insulating layer 140. The semiconductor 154 overlaps the gate electrode 124. The semiconductor 154 may include amorphous silicon, polycrystalline silicon, a metal oxide, and the like. An ohmic contact member (not shown) may be further formed on the semiconductor 154. The ohmic contact may include a silicide or a material such as n+ hydrogenated amorphous silicon, in which an n-type impurity is highly doped.

A data line 171, a source electrode 173, and a drain electrode 175 are formed on the semiconductor 154. The source electrode 173 is protruded from the data line 171, and the drain electrode 175 is separated from the source electrode 173. The source electrode 173 and the drain electrode 175 overlap the gate electrode 124. The gate electrode 124, the source electrode 173, and the drain electrode 175 are integrated with the semiconductor 154 to form a thin-film transistor Q, and a channel of the thin-film transistor Q is formed between the source electrode 173 and the drain electrode 175. A passivation layer 180 is formed on the data line 171, the source electrode 173, the drain electrode 175, and an exposed semiconductor 154. A pixel electrode 191 is formed on the passivation layer 180. The pixel electrode 191 may include a transparent metal oxide such as indium tin oxide (ITO) or indium zinc oxide (IZO).

The pixel electrode 191 may have a substantial quadrangle shape. The pixel electrode 191 includes a cross-shaped stem including a horizontal stem portion 193, and a vertical stem portion 192 crossing the horizontal stem portion 193. Further, the pixel electrode 191 includes a micro-branch portion 194 that extends from the horizontal stem portion 193 and the vertical stem portion 192. An extension 197 is further formed to extend from the pixel electrode 191. The extension 197 is physically and electrically connected to the drain electrode 175 through a contact hole 185 to receive a data voltage from the drain electrode 175. The contact hole 185 is formed at the passivation layer 180 and an overcoat 182, and the pixel electrode 191 is connected to the drain electrode 175 through the contact hole 185.

The fourth color pixel area PX(W) is divided into four domains D1, D2, D3, and D4 by the horizontal stem portion 193 and the vertical stem portion 192 of the pixel electrode 191. The micro-branch portion 194 obliquely extends from the horizontal stem portion 193 and the vertical stem portion 192. In the first domain D1, the micro-branch portion 194 extends from the horizontal stem portion 193 or the vertical stem portion 192 upwardly and leftwardly. In the second domain D2, the micro-branch portion 194 extends from the horizontal stem portion 193 or the vertical stem portion 192 upwardly and rightwardly. In the third domain D3, the micro-branch portion 194 extends from the horizontal stem portion 193 or the vertical stem portion 192 downwardly and rightwardly. In the fourth domain D4, the micro-branch portion 194 extends from the horizontal stem portion 193 or the vertical stem portion 192 downwardly and leftwardly.

Each micro-branch portion 194 may form an angle of about 45 or 135 degrees with respect to the gate line 121 or the horizontal stem portion 193. Extending directions of the micro-branch portions 194 of two adjacent domains D1 and D2, and D3 and D4, may be perpendicular to each other. The pixel electrode 191 may further include an outer stem that surrounds an outer circumference of the fourth color pixel area PX(W).

The white filter 230W is formed on the second substrate 210 that is disposed to face the first substrate 110. The light blocking member 220 is formed at the edge portion of the fourth color pixel area PX(W), and the overcoat 240 is formed on the white filter 230W and the light blocking member 220. The light blocking member 220 adjacent to the white filter PX(W) may be formed to have a width that is wider than the light blocking member 220 adjacent to the first, second, or third color pixel area PX(R), PX(G), or PX(B). Accordingly, the white filter 230W disposed in the fourth color pixel area PX(W) may block the light 510 in a broader region than the red filter 230R, the green filter 230G, and the blue filter 230B respectively disposed in the first, second, and third color pixel areas PX(R), PX(G), and PX(B). In the remaining region except for the edge portion of the display panel 1000, all the light blocking members 220 may be formed to have the same width.

A common electrode 270 is formed on the overcoat 240. The common electrode 270 may be made of a transparent metal oxide such as indium tin oxide (ITO) or indium zinc oxide (IZO). A predetermined voltage such as a common voltage is applied to the common electrode 270. When a data voltage is applied to the pixel electrode 191, an electric field is generated between the pixel electrode 191 and the common electrode 270, and the liquid crystal molecules 310 of the liquid crystal layer 3 disposed therebetween are thereby arranged in a predetermined direction.

The first, second, or third pixel area PX(R), PX(G), or PX(B) may have a similar structure as the fourth color pixel area PX(W). However, unlike the fourth color pixel area PX(W), the first color filter 230R is mostly formed in the first pixel area PX(R), the second color filter 230G is mostly formed in the second pixel area PX(G), and the third color filter 230B is mostly formed in the third pixel area PX(B). Further, a light blocking member 220 adjacent to the first, second, and third color pixel areas PX(R), PX(G), and PX(B) may be formed to have a smaller width than the width of the light blocking member 220 adjacent to the fourth color pixel area PX(W).

According to an exemplary embodiment of the present invention, the color filter 230R, 230G, 230B, and 230W may be respectively disposed on the first substrate 110, as described with reference to FIG. 5.

Figure 5:
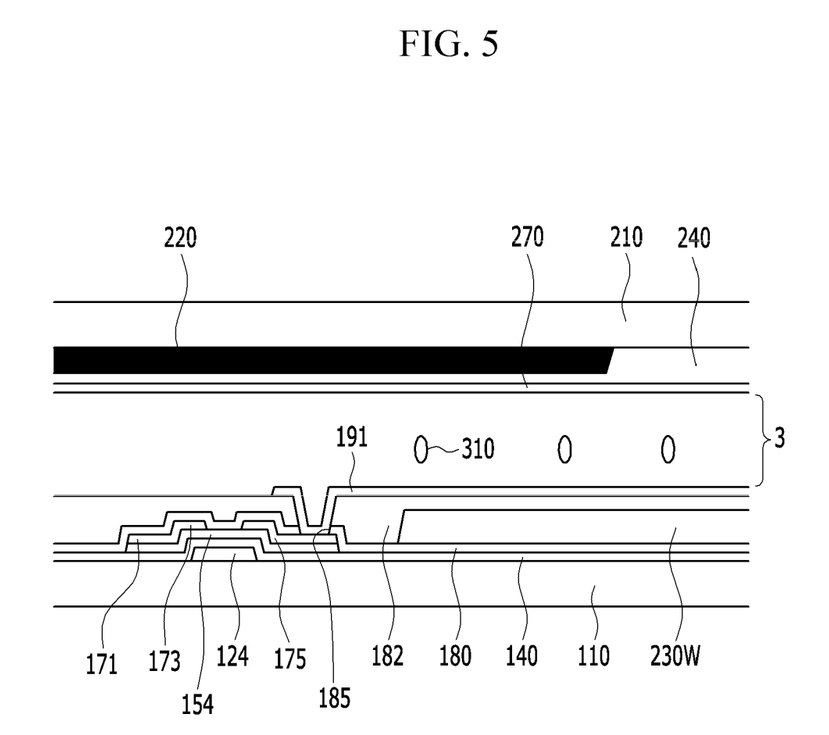
FIG. 5 is a cross-sectional view of a curved display device according to an exemplary embodiment of the present invention.

FIG. 5 is a cross-sectional view of a curved display device according to an exemplary embodiment of the present invention. FIG. 5 illustrates a fourth color pixel area PX(W).

Referring to FIG. 5, a gate electrode 124, a semiconductor 154, a source electrode 173, a drain electrode 175, and a passivation layer 180 are formed on a first substrate 110, and a white filter 230W is disposed on the passivation layer 180. An overcoat 182 is formed on the passivation layer 180 and the white filter 230W, and a pixel electrode 191 is formed on the overcoat 182. A contact hole 185 is formed in the passivation layer 180 and the overcoat 182, and the pixel electrode 191 is connected to the drain electrode 175 to through the contact hole 185. A light blocking member 220, the overcoat 240, and a common electrode 270 are formed on a second substrate 210.

A light blocking member 220 disposed in a region corresponding to the white filter PX(W) may be formed to have a broader width than a light blocking member 220 adjacent to the first, second, or third color pixel area PX(R), PX(G), or PX(B). Accordingly, the white filter 230W disposed in the fourth color pixel area PX(W) may block the light 510 in a broader region than the red filter 230R, the green filter 230G, or the blue filter 230B respectively disposed in the first, second, or third color pixel area PX(R), PX(G), or PX(B). However, in the remaining region except for the edge portion of the display panel 1000, all the light blocking members 220 may be formed to have the same width.

The first, second, or third pixel area PX(R), PX(G), or PX(B) may have a similar structure as the fourth color pixel area PX(W). In the first pixel area PX(R), the red filter 230R may be disposed on the first substrate 110. In the second pixel area PX(G), the green filter 230G may be disposed on the first substrate 110. In the third pixel area PX(B), the blue filter 230B may be disposed on the first substrate 110.

A light blocking member 220 corresponding to the first, second, and third color pixel areas PX(R), PX(G), and PX(B) may be formed to have a width that is narrower than that of a light blocking member 220 corresponding to the fourth color pixel area PX(W). Alternatively, the light blocking member 220 may be formed on the first substrate 110. Further, the light blocking member 220 may be formed on the passivation layer 180, and the overcoat 182 may be formed on the passivation layer 180, the white filter 230W, and the light blocking member 220.

A curved display device according to an exemplary embodiment of the present invention will now be described in detail with reference to FIGS. 6A and 6B.

Figure 6A:
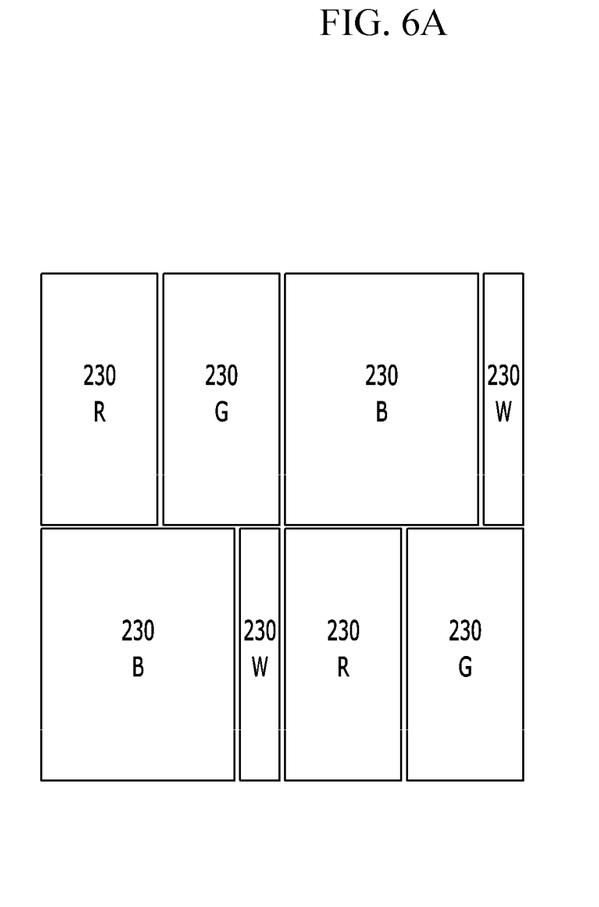
FIGS. 6A and 6B are pixel layouts at an edge portion of a curved display device according to an exemplary embodiment of the present invention.
Figure 6B:
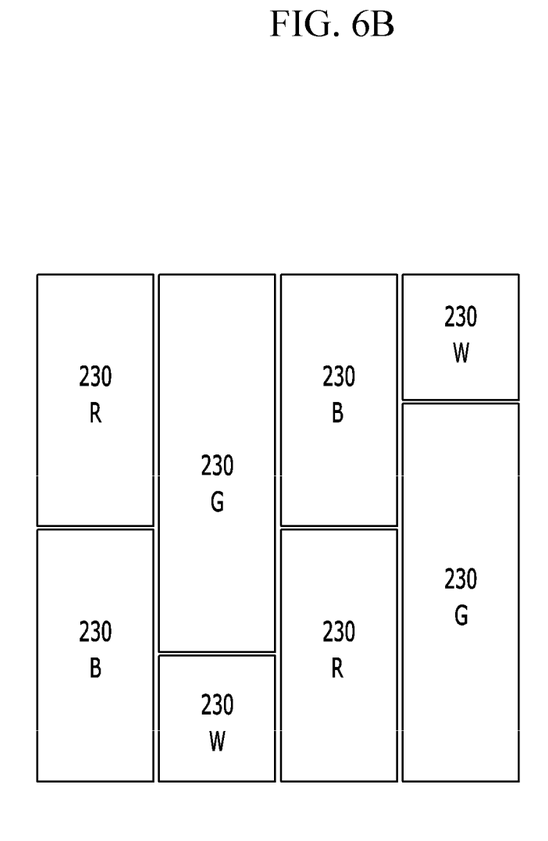

FIGS. 6A and 6B are pixel layouts at an edge portion of the curved display device according to the present exemplary embodiment.

As shown in FIGS. 6A and 6B, color pixel areas PX(R), PX(G), PX(B), and PX(W) disposed at edge portions of the curved display device are formed in a stripe arrangement, and a red filter 230R, a green filter 230G, a blue filter 230B, and a white filter 230W are respectively disposed in the pixel areas PX(R), PX(G), PX(B), and PX(W).

In pixels disposed at the edge portions of the curved display device according to the present exemplary embodiment, one of the red, green, and blue filters 230R, 230G, and 230B adjacent to the white filter 230W is formed to have a greater area than the remaining filters, and the white filter 230W is formed to have a smaller area than the red, green, or blue filter 230R, 230G, or 230B.

Referring to FIG. 6A, when the blue filter 230B is formed to have a greater area than the remaining filters, an area difference between the blue filter 230B and the red or green filter 230R or 230G may be the same as an area difference between the white filter 230W and the red or green filter 230R or 230G. More particularly, the white filter 230W may be formed smaller by an increased area of one filter compared with the remaining filters, when the one filter is larger than the remaining filters.

In FIG. 6A, one of the red, green, and blue filters 230R, 230G, and 230B is formed to have a larger short side than the remaining filters, and in FIG. 6B, one of the red, green, and blue filters 230R, 230G, and 230B is formed to have a larger long side than the remaining filters. More particularly, in FIG. 6A, the white filter 230W is formed to have a smaller short side than the red, green, or blue filter 230R, 230G, or 230B. In FIG. 6B, the white filter 230W is formed to have a smaller long side than the red, green, or blue filter 230R, 230G, or 230B. Alternatively, the white filter 230W may be formed to have a smaller size than the red, green, or blue filter 230R, 230G, or 230B.

As described above, the curved display device according to exemplary embodiments of the present invention may prevent light leakage and spots at an edge portion of a display panel by changing sizes of the pixel areas disposed at the edge portion of thereof.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:
1. A curved display device, comprising:
a first substrate;
a second substrate facing the first substrate;
a liquid crystal layer disposed between the first substrate and the second substrate; and
a first color pixel, a second color pixel, a third color pixel, and a fourth color pixel disposed on the first substrate or the second substrate,
wherein:
the first substrate and the second substrate comprise a center portion and an edge portion surrounding the center portion;
the first, second, and third color pixels each comprise a red filter, a green filter, and a blue filter, respectively;
the fourth color pixel comprises a white filter;

the size of the white filter disposed at the edge portion of the first or second substrate is smaller than the size of the red, green, and blue filters disposed at the edge portion;

the size of the white filter disposed at the center portion of the first or second substrate is the same as the size of the red, green, and blue filters disposed at the center portion; and filters of the same color in the edge portion have the same size.

2. The curved display device of claim 1, wherein pixel electrodes disposed in the first, second, third, and fourth color pixels comprise the same size.

3. The curved display device of claim 1, further comprising light blocking members disposed between the red, green, blue, and white filters,
wherein in the edge portion, a width of a light blocking member of the light blocking members adjacent to the white filter disposed in the fourth color pixel is greater than a width of each of the light blocking members adjacent to the red filter, the green filter, and the blue filter.

4. The curved display device of claim 3, wherein the first, second, third, and fourth color pixels comprise a quadrangular shape.

5. The curved display device of claim 4, wherein the light blocking member surrounds edge portions of the quadrangular shape.

6. The curved display device of claim 1, further comprising an overcoat covering the red, green, blue, white filters, and the light blocking members.

7. The curved display device of claim 6, further comprising a light source disposed at a rear surface of the first or second substrate.

8. The curved display device of claim 1, further comprising pixel electrodes respectively disposed in the first, second, third, and fourth color pixels,
wherein in the edge portion, the pixel electrode disposed in the fourth color pixel is smaller than each of the pixel electrodes disposed in the first, second, and third color pixels.

9. The curved display device of claim 8, wherein in the center portion, the fourth color pixel comprises the same size as the first, second, or third color pixels.

10. The curved display device of claim 9, wherein the red, green, blue, and white filters comprise the same size as the pixel electrodes disposed in the first, second, third, and fourth color pixels, respectively.

11. The curved display device of claim 10, further comprising light blocking members disposed between the red, green, blue, and white filters.

12. The curved display device of claim 11, wherein the first, second, third, and fourth color pixels comprise a quadrangular shape.

13. The curved display device of claim 11, further comprising an overcoat covering the red, green, blue, white filters, and the light blocking members.

14. The curved display device of claim 13, further comprising a light source disposed at a rear surface of the first or second substrate.

15. The curved display device of claim 10, wherein in the edge portion, among the red, green, blue, and white filters:
the white filter comprises a first size;
one of the red, green, and blue filters comprises a second size greater than the first size; and
remaining filters comprise a third size greater than the first size and smaller than the second size.

16. The curved display device of claim 15, wherein a difference between the first size and the third size is the same as a difference between the second size and the third size.

17. The curved display device of claim 16, wherein the first size comprises a width smaller than a width of the second and third sizes.

18. The curved display device of claim 16, wherein the first size comprises a length less than a length of the second and third sizes.

19. A curved display device, comprising: a first substrate;
a second substrate facing the first substrate;
a liquid crystal layer disposed between the first substrate and the second substrate;
a first color pixel, a second color pixel, a third color pixel, and a fourth color pixel disposed on the first substrate or the second substrate; and
pixel electrodes respectively disposed in the first, second, third, and fourth color pixels,
wherein:
the first substrate and the second substrate comprise a center portion and an edge portion surrounding the center portion;
the first, second, and third color pixels each comprise a red filter, a green filter, and a blue filter, respectively;
the fourth color pixel comprises a white filter; and
each white filter disposed at the center portion has a different size from each white filter disposed at the edge portion.

* * * * *